(12) United States Patent
Miller

(10) Patent No.: US 7,111,083 B2
(45) Date of Patent: Sep. 19, 2006

(54) METHOD AND APPARATUS FOR USE OF POWER SWITCH TO CONTROL SOFTWARE

(75) Inventor: Gregory L. Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/823,611

(22) Filed: Mar. 30, 2001

(65) Prior Publication Data

US 2002/0144030 A1    Oct. 3, 2002

(51) Int. Cl.
*G06F 3/00* (2006.01)
*G06F 9/00* (2006.01)
*G06F 1/24* (2006.01)

(52) U.S. Cl. ............... 710/10; 710/12; 710/14; 710/15; 710/16; 710/17; 710/18; 710/62; 713/1; 713/2; 713/100

(58) Field of Classification Search ............... 710/1, 710/5, 7, 10, 11, 58, 36, 12, 14–18; 713/1, 713/2
See application file for complete search history.

(56) References Cited

U.S. PATENT DOCUMENTS

| | | | | |
|---|---|---|---|---|
| 4,543,066 A | * | 9/1985 | French | 434/242 |
| 5,388,156 A | * | 2/1995 | Blackledge et al. | 713/202 |
| 5,978,923 A | * | 11/1999 | Kou | 713/323 |
| 6,278,441 B1 | * | 8/2001 | Gouzman et al. | 345/163 |
| 6,356,965 B1 | * | 3/2002 | Broyles et al. | 710/104 |

\* cited by examiner

*Primary Examiner*—Kim Huynh
*Assistant Examiner*—Alan Chen
(74) *Attorney, Agent, or Firm*—Jeffrey B. Huter

(57) ABSTRACT

An apparatus and method for selectively loading and enabling software stored within firmware of an electronic device to support an input device coupled to the electronic device if a power switch is pressed and held for at least a predetermined period of time as the power switch is used to turn the electronic device on.

25 Claims, 2 Drawing Sheets

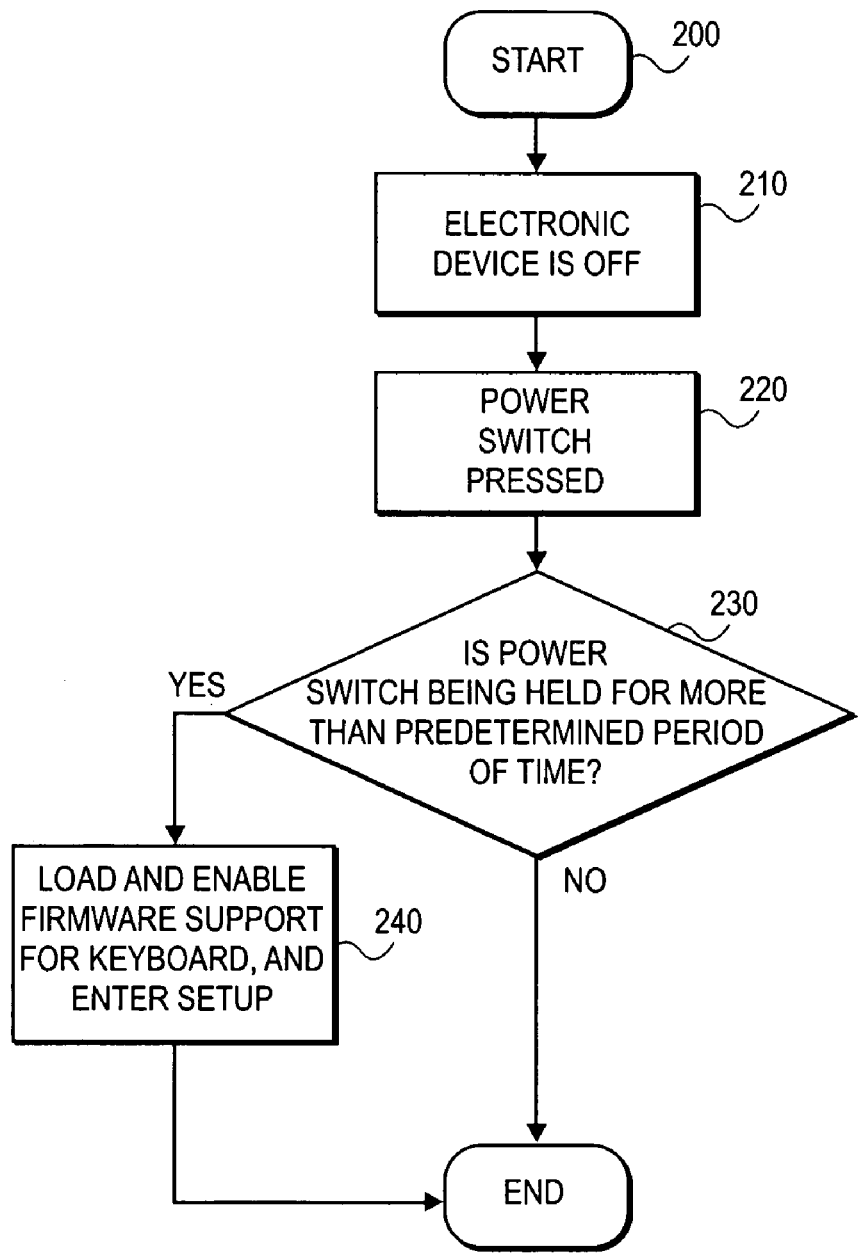

METHOD AND APPARATUS FOR USE OF POWER SWITCH TO CONTROL SOFTWARE

FIELD OF THE INVENTION

The present invention is related to the use of a power switch to control software activity from an off state

ART BACKGROUND

The use of a power switch to turn an electronic device, such as a computer system, on or off is very widely known. More recently, with the advent of proliferation of portable electronic devices, such as so-called "notebook" computers, the use of a switch to change the power state of an electronic device, causing an electronic device to enter or exit a "suspend" or "hibernate" or other power conserving state, has become widely known. It is also widely known to use switches, generally, to start or stop the execution of various software routines on electronic devices having a processor. Common examples of such a use of switches are "reset" switches that cause software already running on an electronic device to be stopped while also causing software routines to reinitialize that electronic device to be started, or "setup" switches that cause software routines that allow a user to set parameters for an electronic device to be started.

In the area of computer systems, it is common to run a combination of software during the normal use of a computer system, and it is also common for different combinations of software to be run when a computer system is being configured for normal use. Each piece of software that is run on a computer system makes use of that computer system's resources, most notably memory and processor time, and it is widely accepted that it is not desirable to waste such resources by loading and running pieces of software that are not needed. Commonly available computer systems are designed to run a variety of operating systems and applications software, and part of this flexibility is achieved by providing a wide-ranging set of software routines within a computer's built-in repository of firmware. Often, much of the function served by the software routines within the firmware was to provide support for an array of input and output devices, such as keyboards, displays, terminals and printers. Operating systems running on such computer systems would often rely on these software routines within the firmware to provide this support. One of the best known examples of this is the basic input/output software ("BIOS") found in read-only or erasable integrated circuits found on the main circuit board of widely available personal computers.

More recently, however, it has become common practice for operating systems to provide support for such input and output devices in order to allow greater flexibility in optimizing how these devices would interact with the operating system. As a result, operating systems have begun to rely progressively less and less on the software routines within the firmware, and this has begun to obviate the need to load and run such software routines.

However, despite this developing trend on the part of operating systems, such that the loading and running of such software routines within the firmware is often unnecessary during normal use of a computer system, there are still situations outside of normal use in which the loading and running of such software routines is desirable or even necessary. The most common example of such a situation is the running of setup software to configure a computer system for use. Often, setup software must be run to configure a computer system before an operating system can be loaded and run, and so there is no opportunity to make use of the support for input and output devices that might have been provided by an operating system.

Due to this continuing need to provide input and output device support ahead of loading and running an operating system, it is common for computer systems to be designed to always load and run the software routines within the firmware that provide such support, regardless of whether or not there is a need to do so. At a point after these software routines are loaded and support for input and output devices is now provided, it is common for user to be presented with the option to press a key on a keyboard connected to the computer system in order to start the setup software within the firmware. However, this wastes time, forcing the user of a computer system to wait while these software routines are loaded and run each time a computer system is turned on for the few occasions outside of normal use of the computer system where the user may desire to run such setup software.

The need exists to allow a user of an electronic device, such as a computer system, to be able to turn on the electronic device and to be able to choose at the time of doing so, what kinds of software will be run in order to allow the user to avoid unnecessary delays in turning on an electronic device for normal use.

BRIEF DESCRIPTION OF THE DRAWINGS

The objects, features, and advantages of the present invention will be apparent to one skilled in the art in view of the following detailed description in which:

FIG. 2 is a flowchart of another embodiment of the present invention.

DETAILED DESCRIPTION

Figure 1:
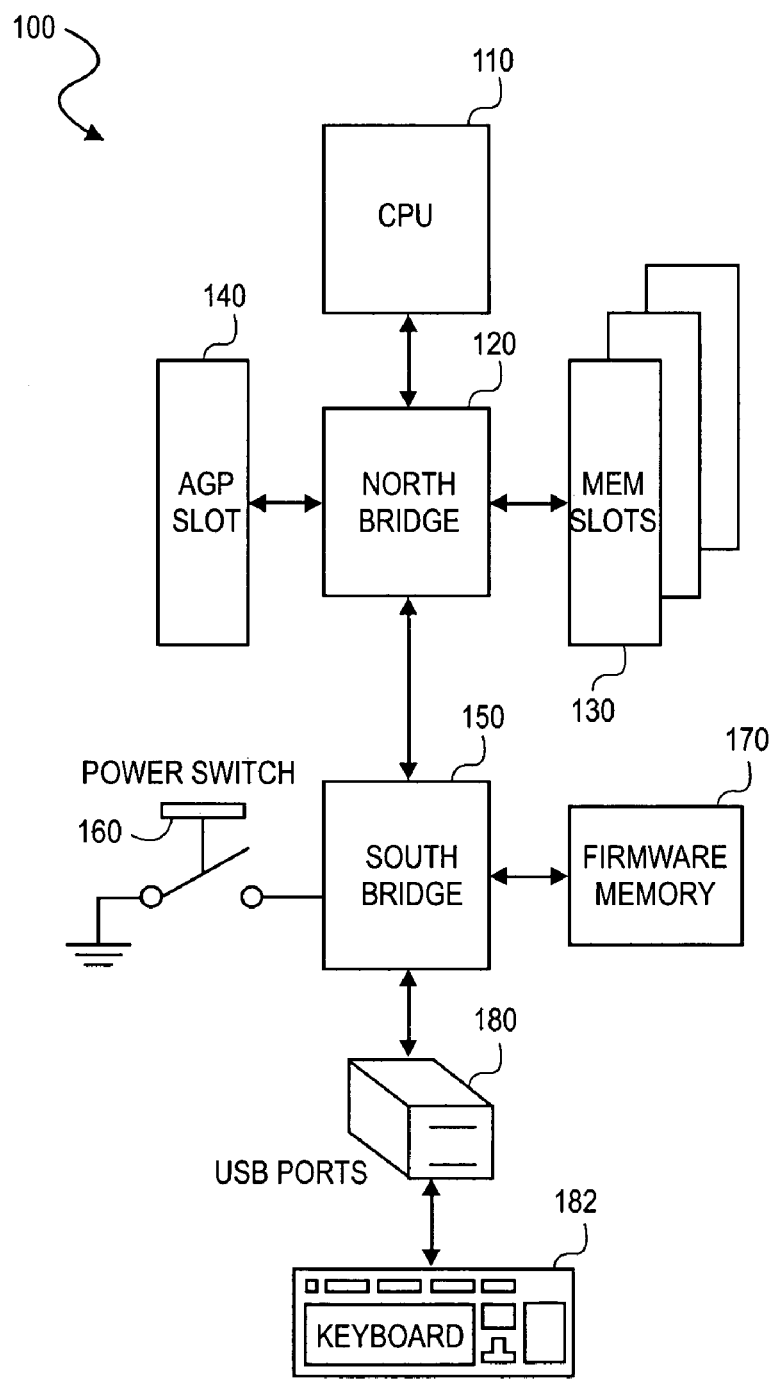
FIG. 1 is a block diagram of one embodiment of the present invention.

In the following description, for purposes of explanation, numerous details are set forth in order to provide a thorough understanding of the present invention. However, it will be apparent to one skilled in the art that these specific details are not required in order to practice the present invention.

The present invention concerns adding functionality to the power switch already provided on many computer systems to choose whether or not to load and run various pieces of software. Specifically, the present invention concerns adding the ability to use the power switch to both turn on a computer system and select whether or not to load and run software support in a computer's firmware for such devices as a keyboard. However, as those skilled in the art will appreciate, the present invention is also applicable to selectively enabling or disabling other aspects of software, such as whether or not to enter a setup or a diagnostics routine, or to select a startup configuration for a computer system. Also, the present invention is applicable to input devices other than keyboards, such as mice, displays, etc., and the present invention is applicable to devices with power switches other than computers, such as audio/visual entertainment devices, various office machines, etc.

FIG. 1 is a block diagram of one embodiment of the present invention. Computer system 100 is comprised of processor 110, north bridge IC 120, memory slots 130, AGP slot 140, south bridge IC 150, power switch 160, firmware memory 170, and USB (universal serial bus) ports 180.

Processor 110 is the processing unit of computer system 100, though in alternate embodiments, there could be more than one processor. North bridge IC 120 and south bridge IC 150 are two ICs coupled together and comprising what is commonly referred to as either a "support chipset" or "core logic" that cooperate with processor 110 to comprise much of the basic circuitry of computer system 100. As those skilled in the art will recognize, the support chipset or core logic of computer system 100 may be implemented in numerous other ways where the functions performed by north bridge IC 120 and south bridge IC 150 may be combined within a single IC or divided in many possible ways among a plurality of ICs.

Memory slots 130 may be commonly used SIMM or DIMM sockets, or some other form of connector coupled to north bridge IC 120 to provide locations to which memory for computer system 100 may be coupled. However, in alternate embodiments, memory ICs may be directly coupled to north bridge IC 120 in place of or in addition to memory slots 130. AGP slot 140 is a connector coupled to north bridge IC 120 to which a graphics board (not shown) may be coupled to provide support for a display to be attached to computer system 100. Alternatively, a graphics controller IC (not shown) could be directly coupled to north bridge IC 120 in place of AGP slot 140. Power switch 160 is a normally open momentary pushbutton switch used, as a minimum, to turn computer system 100 on and off. As shown, one conductor of power switch 160 is coupled to ground (or alternatively, to some other voltage level) and the other conductor coupled to south bridge IC 150.

Coupled to south bridge IC 150, firmware memory 170 stores software routines used in initializing, configuring and/or testing computer system 100. As those skilled in the art will recognize, firmware memory 170 may alternatively be coupled to north bridge IC 120 or to other components of computer system 100 to enable the use of the firmware programs contained within firmware memory 170. Although in one embodiment, the firmware programs residing in firmware memory 170 may be run directly from within firmware memory 170, in an alternate embodiment, one or more of the firmware programs residing within firmware memory 170 may be copied from firmware memory 170 to memory coupled to memory slots 130 before being run.

Also coupled to south bridge IC 150, USB ports 180 provide connections to which devices providing additional functionality to computer system 100 may be coupled. As depicted in FIG. 1, keyboard 182 is coupled to USB ports 180, however, in an alternate embodiment, keyboard 182 could be coupled to a dedicated keyboard and/or mouse input port (not shown). In other alternate embodiments, a mouse (not shown) could be coupled to USB ports 180, or to a dedicated keyboard and/or mouse input port (not shown), or to a serial data port (not shown) that conforms to such widely used standards as RS-232 or RS-422.

In one embodiment of the present invention, a predetermined period of time is used in differentiating whether or not power switch 160 has been pressed and held, or simply pressed. In this embodiment, if power switch 160 is pressed, but then released before the predetermined period of time from the act of pressing has elapsed, then computer system 100 is turned on and one set of software routines is loaded. However, in this same embodiment, if power switch 160 is pressed and held for at least the predetermined period of time before being released, then computer system 100 is turned on and a different set of software routines is loaded.

In one embodiment, the difference between the software routines that are loaded when power switch 160 is pressed versus pressed and held is that when power switch 160 is pressed and held, software routines within firmware 170 for supporting keyboard 182 are loaded, but when power switch 160 is only pressed, but not held, such software routines to support keyboard 182 are not loaded. In another embodiment, the difference between the software routines that are loaded are such that when are when power switch 160 is pressed and held, setup software used to configure computer system 100 is loaded and run. In still another embodiment, both software routines to support input and output devices, and to configure computer system 100 are loaded and run, depending on whether or not power switch 160 is held when pressed.

In one embodiment, the predetermined period of time is preset to be 3 seconds, such that if power switch 100 is pressed and held for 3 seconds or less, then the action is treated as power switch 160 having only been pressed. In another embodiment, the predetermined period of time may have a default value, but then this value may be altered by the user of computer system 100, possibly through setup software within firmware memory 170. In still another embodiment, the predetermined period of time may be alterable by the manufacturer of the computer system or by service personnel, either at the time of manufacture or repair, or possibly, remotely. In still other embodiments, firmware support for a mouse (not shown) may be loaded in addition to firmware support for keyboard 182.

In one embodiment, an initialization software routine within firmware memory 170 checks for whether power switch 160 was pressed and held or only pressed, while in an another embodiment, an initialization software routine loaded in memory slots 130 performs this function. In another embodiment, logic is coupled to power switch 160 to distinguish between whether power switch 160 is pressed and held or only pressed.

In alternate embodiments, the initialization software routine, software for providing support for devices such as keyboard 182, and/or setup software are stored on other forms of machine-readable media, including magnetic and optical disks. For example, software to carry out the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

FIG. 2 is a flow chart of another embodiment of the present invention. Starting at 200, the computer is initially turned off at 210. At 220, the power switch is pressed by a user. At 230, if the user has continued to press the power switch for more than a predetermined period of time, then at 240, firmware support for a keyboard is loaded, and the computer begins to run firmware-based setup software. However, if at 230, the user has let go of the power switch before a predetermined period of time has been exceeded, then no firmware support for the keyboard is loaded, and the firmware-based setup software is not run.

In an alternate embodiment, at 240, firmware support for a keyboard would be loaded, but no firmware-based setup software would be run. In another embodiment, the predetermined period of time would be 3 seconds. In still another embodiment, this time period is alterable by the user of the computer and/or by the manufacturer of the computer.

The invention has been described in conjunction with the preferred embodiment. It is evident that numerous alternatives, modifications, variations and uses will be apparent to those skilled in the art in light of the foregoing description. It will be understood by those skilled in the art that the present invention may be practiced in support of various types of computer systems such as portable notebook computers, desktop systems, rackmount server systems, etc. It will also be understood by those skilled in the art that the present invention may be practiced in support of devices other than computer systems such as audio or video entertainment devices, or other appliances controlled by electronic circuitry.

The example embodiments of the present invention are described in the context of a power switch for computer systems. However, the present invention is applicable to other control switches such as reset switches, keyboard security lock switches, so-called "turbo" switches, or other user-accessible controls.

What is claimed is:

1. An apparatus comprising:
   a processor;
   a port to which an input device may be coupled;
   a firmware memory in which software to support the input device resides; and
   a power switch to cause the apparatus to be powered on and the software to support the input device to be loaded and executed by the processor if the power switch is pressed at a time when the apparatus is turned off and is held for at least a predetermined period of time, and to cause the apparatus to be powered on and the software to support the input device to not be loaded if the power switch is pressed at a time when the apparatus is turned off and is held for less than the predetermined period of time.

2. The apparatus of claim 1, wherein the processor further executes setup software residing in the firmware memory if the power switch is pressed at a time when the apparatus is turned off and is held for at least a predetermined period of time.

3. The apparatus of claim 1, wherein the predetermined period of time is 3 seconds.

4. The apparatus of claim 1, wherein the predetermined period of time is adjustable.

5. The apparatus of claim 1, wherein the port to which the input device is coupled is a universal serial bus port.

6. The apparatus of claim 5, wherein the input device is a keyboard.

7. The apparatus of claim 1, wherein the port to which the input device is coupled is a keyboard port.

8. The apparatus of claim 7, wherein the input device is a keyboard.

9. The apparatus of claim 1, wherein the apparatus is a computer system.

10. The apparatus of claim 1, wherein the apparatus is an audio/visual entertainment appliance.

11. A method, comprising:
    detecting the pressing of a power switch on an electronic device when the electronic device is turned off;
    measuring the length of time for which the power switch was pressed to differentiate between whether the power switch was pressed or was pressed and held; and
    powering up the electronic device and loading software to support an input device that may be coupled to a port on the electronic device if the power switch was pressed and held, and refraining from loading the software to support the input device if was pressed, but not held.

12. The method of claim 11, wherein the electronic device is a computer system.

13. The method of claim 11, further comprising running setup software if the power switch was pressed and held.

14. The method of claim 11, wherein a predetermined period of time of 3 seconds is used to differentiate between whether the power switch was pressed or was pressed and held.

15. The method of claim 11, wherein an adjustable predetermined period of time is used to differentiate between whether the power switch was pressed or was pressed and held.

16. The method, of claim 11, wherein the port to which the input device is coupled is a universal serial bus port.

17. The method of claim 16, wherein the input device is a keyboard.

18. An apparatus comprising:
    a processor;
    a firmware memory in which setup software to configure the apparatus resides; and
    a power switch to cause the setup software to be loaded and executed by the processor if the power switch is pressed at a time when the apparatus is turned off and is held for at least a predetermined period of time, and to cause the setup software to be prevented from being loaded and executed by the processor if the power switch is pressed at a time when the apparatus is turned off and is held for less than the predetermined period of time.

19. The apparatus of claim 18, wherein the predetermined period of time is 3 seconds.

20. The apparatus of claim 18, wherein the predetermined period of time is adjustable.

21. The apparatus of claim 18, wherein the apparatus is a computer system.

22. The apparatus of claim 18, wherein the apparatus is an audio/visual entertainment appliance.

23. A computer readable medium comprising instructions, which when executed by a processor of an electronic device, causes the processor to:
    detect the pressing of a power switch on the electronic device when the electronic device is turned off;
    measure the length of time for which the power switch was pressed to differentiate between the power switch being pressed and held, versus being pressed, but not held; and
    load and enable support for an input device that may be coupled to a port on the electronic device if the power switch was pressed and held, and refraining from enabling support for the input device that may be coupled to the port on the electronic device if the power switch was pressed, but not held.

24. A computer readable medium comprising instructions, which when executed by a processor of an electronic device, causes the processor to:
    detect the pressing of a power switch on the electronic device when the electronic device is turned off;
    measure the length of time for which the power switch was pressed to differentiate between the power switch being pressed and held, versus being pressed, but not held; and
    load and enable setup software to configure the electronic device if the power switch was pressed and held, and refrain from loading and enabling setup software to configure the electronic device if the power switch was pressed, but not held.

25. The computer readable medium of claim 24, wherein the electronic device is a computer.

* * * * *